United States Patent [19]
Butler

[11] 3,906,801
[45] Sept. 23, 1975

[54] APPARATUS FOR BALANCING ROTATING BODIES

[75] Inventor: Louis L. Butler, Baton Rouge, La.

[73] Assignee: Bear Manufacturing Corporation, Rock Island, Ill.

[22] Filed: Mar. 29, 1974

[21] Appl. No.: 456,143

Related U.S. Application Data

[63] Continuation of Ser. No. 371,369, June 19, 1973, abandoned, which is a continuation of Ser. No. 234,488, March 14, 1972, abandoned.

[52] U.S. Cl............................... 73/457; 73/459
[51] Int. Cl.²........................................ G01M 1/28
[58] Field of Search............ 73/457, 459, 466, 487, 73/70.2, 71.2; 200/61.49, 61.51

[56] References Cited
UNITED STATES PATENTS

| | | | |
|---|---|---|---|
| 2,301,291 | 11/1942 | Kolesnik | 73/457 |
| 2,522,260 | 9/1950 | Forster | 73/457 |
| 2,565,577 | 8/1951 | Schnoebelen | 73/457 X |
| 2,604,558 | 7/1952 | Hermann | 73/457 X |
| 2,680,966 | 6/1954 | Adkins | 73/457 |
| 3,078,720 | 2/1963 | Hofmann | 73/457 |
| 3,675,495 | 7/1972 | MacMillan | 73/457 X |

FOREIGN PATENTS OR APPLICATIONS

| | | | |
|---|---|---|---|
| 555,595 | 8/1943 | United Kingdom | 73/70.2 |

*Primary Examiner*—James J. Gill
*Attorney, Agent, or Firm*—Roy E. Petherbridge; Robert L. Lindgren; Edward D. Gilhooly

[57] ABSTRACT

A sensing unit is detachably clamped to and supported on the support components of a rotating wheel. The unit includes two inertia switches in orthogonal relation to one another, and a seismic sensor. The switches are selectively connected in the control circuit of a strobe light for detecting and locating the area of apparent unbalance of the wheel as it is rotated. The seismic sensor operates a meter to indicate the magnitude of the weight of unbalance.

6 Claims, 8 Drawing Figures

US Patent  Sept. 23, 1975  Sheet 1 of 2  3,906,801
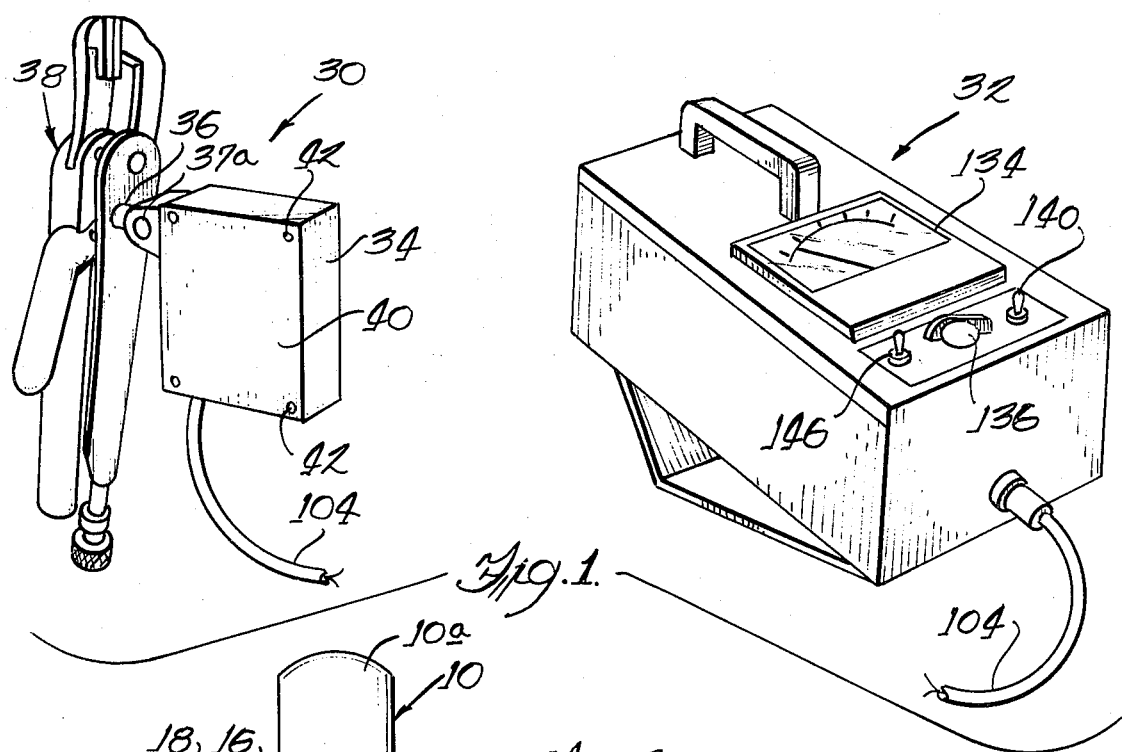
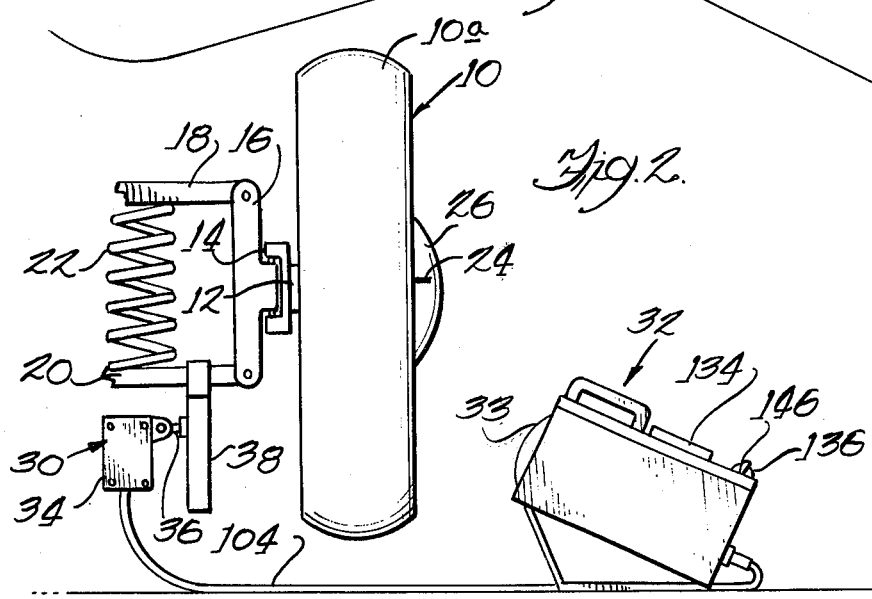
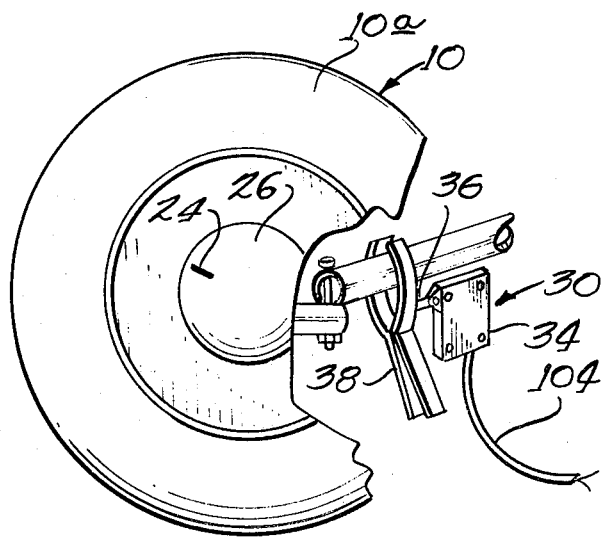

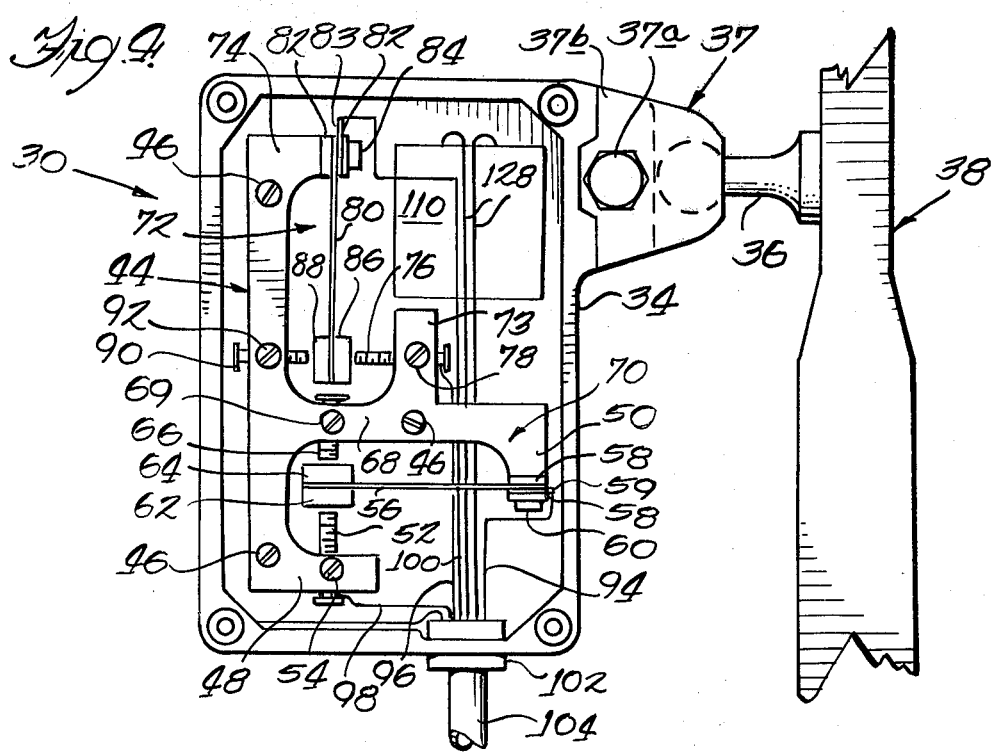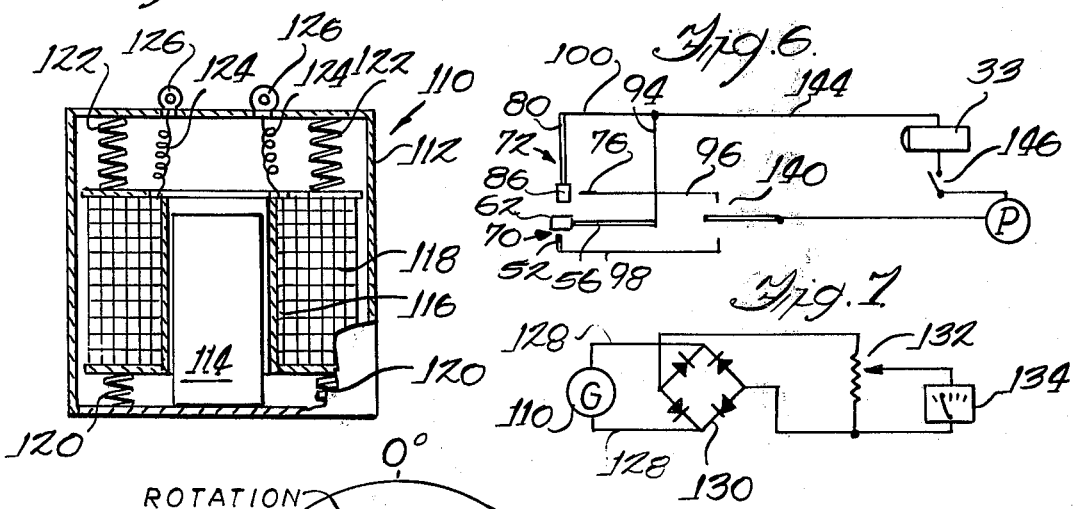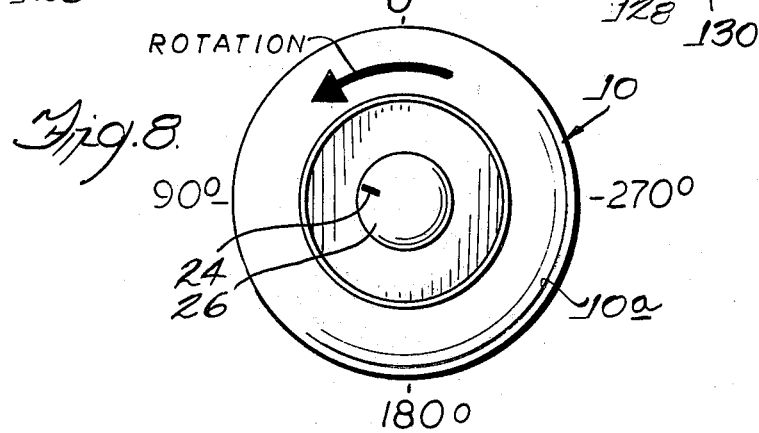

APPARATUS FOR BALANCING ROTATING BODIES

This is a continuation of application Ser. No. 371,369 filed June 19, 1973, now abandoned, which was a continuation of application Ser. No. 234,488, filed Mar. 14, 1972, now abandoned.

This invention relates to detecting and locating the area of apparent concentration of unbalanced weight in unbalanced rotating bodies, and particularly pertains to improved apparatus which finds advantageous use in the process of balancing rotating bodies such as automobile wheels by triggering a strobe light to detect and locate the area of apparent unbalance.

Various arrangements have been proposed for detecting and locating the apparent area of unbalance of rotating bodies such as automobile wheels. In one type of such apparatus, electrical switches are actuated to operate an indicator, such as a strobe light. Such devices heretofore generally have been of the type which require one reference point that is fixed and independent of vibratory motion of the rotating body or of apparatus on which the rotating body is mounted. These arrangements require one reference, such as one electrical contact, to be fixed, as by being supported from the ground or floor adjacent to the rotating body or mounted on a separate stationary frame. Moreover, prior art devices have required the use of systems or components which are heavy, cumbersome, inconvenient or require excessive time to utilize in balancing successive rotating bodies, such as in balancing automobile wheels.

It is an object of this invention to overcome the aforementioned problems of the prior art.

It is an object of this invention to provide improved apparatus for detecting an unbalanced condition and identifying the area in which weight should be added to balance an unbalanced rotating body, without requiring an independent reference.

It is an object of this invention to provide improved portable apparatus of the type indicated which is supported on the support structure of the body to be balanced.

It is an object of this invention to provide balancing apparatus which is conveniently and quickly movable from one machine to another and which provides accurate, reliable indications of unbalanced conditions.

In one embodiment of the invention a support is provided with a clamping arrangement for detachably mounting the support on a component of a machine for movement in accordance with the vibrational or oscillating motion induced by an unbalanced rotating body journaled on that machine. An inertia switch is mounted on the support and includes a first contact member fixed with respect to the support and a second weighted contact member which is resiliently supported for movement toward and away from the first contact by virtue of inertia of the second contact member as the support is moved in accordance with the imparted vibrational movement. Electrical leads extend from the two contacts and comprise a portion of an electrical control circuit for operating a high intensity flashing light for illuminating the wheel in accordance with the completion and breaking of this circuit as the second contact member moves relative to the first contact member.

For a more complete understanding of this invention and its advantages reference should now be had to the embodiment illustrated in greater detail in the accompanying drawings and discussed below by way of an example of the invention.

IN THE DRAWINGS

FIG. 1 illustrates wheel balancing apparatus employing teachings of the invention;

FIG. 2 illustrates the apparatus of FIG. 1 with the sensing unit attached to the suspension system (shown schematically) for the front wheel of an automobile for determining static unbalance of the wheel;

FIG. 3 is another view similar to FIG. 2 and illustrating the sensing unit mounted on a steering tie rod for determining dynamic unbalance of the wheel;

FIG. 4 is a plan view of the sensing mechanism shown in FIGS. 2 and 3, with the cover removed;

FIG. 5 is a center sectional view of the generator component of the sensing unit;

FIG. 6 is a wiring diagram of the control circuit for triggering the strobe light of the illustrated apparatus;

FIG. 7 is a wiring diagram of the generator circuit; and

FIG. 8 is an elevation view of a wheel illustrating reference positions.

Referring to the drawings, and particularly to FIGS. 1–3, 10 is a front wheel on an automobile. A typical supporting A-frame assembly is illustrated schematically and comprises a spindle 12, a steering knuckle 14, a knuckle support 16, an upper control arm 18, a lower control arm 20 and a coil spring 22. For purposes of checking the balance of the wheel as described herein, it is assumed that the wheel is supported off of the floor or subjacent surface, as by an appropriate jack or lifting mechanism (not shown) engaging a fixed frame portion of the vehicle. A marker 24, such as a piece of tape, is attached to the front side of the wheel assembly, as on the hub cap 26 as illustrated.

The apparatus for determining the apparent area of unbalance includes a sensing unit 30 and an indicator unit 32. The unit 32 includes a strobe light unit 33 of any appropriate design for instantaneously illuminating wheel 10 in response to an electrical signal. By way of example, an electronic stroboscope Type 1542 of General Radio Company, which was modified to remove the flash-rate control, has been utilized satisfactorily in this apparatus. The unit 33 is orientated to illuminate the wheel when the light is on.

Referring now also to FIG. 4, the sensing unit 30 includes a rigid housing 34, such as of cast aluminum. A mounting shank 36 is affixed to the housing 34 through a ball and socket joint 37 and extends to one side as shown. A bolt 37a clamps the adjustable socket plate 37b against the ball to insure a functionally rigid joint for transferring translational forces to move the housing in accordance with movement of the shank 36. A clamping device 38 is mounted on the shank 36 and is utilized for selectively and detachable mounting the sensor unit 30 on an appropriate portion of the mechanism which supports the wheel 10, see FIGS. 2 and 3. The clamping device 38 provides positive affixation of the sensor unit 30 to the wheel assembly so that the housing 34 will move with the assembly through any vibrational or other oscillatory motion imparted due to rotation of an off balance wheel assembly. The illustrated clamping unit 38 (see FIG. 1) is a pliers-type tool with an over-center toggle grip locking mechanism, often referred to as a "vice-grip." Such a clamping wrench is convenient in that when properly adjusted it may be firmly and positively clamped to an appropriate element of the wheel support assembly by simply squeezing or closing the lever handles. Such a clamping device also may be readily released. A cover 40 normally closes the housing 34, being retained by screws 42, see FIG. 1.

A switch-mounting member 44 is rigidly secured to the housing 34, as by screws 46. The mounting member 44 may be of electrical nonconductive material, such as a reinforced phenolic resin, or may be of any appropriate material or fabrication providing the necessary rigidity and appropriate insulated mountings for the switch elements to be described below. The mounting 44 includes a leg 48 and a post 50. An electrical contact screw 52 is threaded through the leg 48 and locked at a desired longitudinal adjustment setting by a screw 54. Screw 52 thus provides an electrical contact which is fixed with respect to the mounting. A flexible switch member 56 is mounted on the post 50, with its proximal end clamped between a pair of electrically insulative washers 58 and a connector 59 and secured by a pair of screws 60. Contact elements of significant weight are attached to the outer or distal end of the blade 56 and may comprise a brass pin or rivet 62 extending through an opening (not shown) in the end of the blade 56, with a bushing 64 secured to the shank of pin 62 which projects through the blade as by riveting or staking. The blade 56 is a flexible and resilient conductor, as by being of spring steel or similar material, such that the contact 62 is free to move toward and away from the contact 52 by inertia as the sensor assembly 30 is moved with an accelerating or decelerating movement in either direction parallel to an axis perpendicular to the blade 56. A stop screw 66 is threaded through an opposite leg 68 of the mounting member 44. The screw 66 is adjusted to limit the maximum displacement of contact 62 from contact 52, and is locked in the selected position by locking screw 69. The switch assembly just described is sometimes referred to hereinafter as the "static" switch and is identified generally by the numeral 70.

Another switch assembly 72 similar to that just described is mounted on leg 73 and post 74 of the member 44. This second switch assembly includes an adjustable contact screw 76, locking screw 78, blade 80 supported between electrical insulators 82 and connector 83 and retained by a pair of screws 84, contact and weight elements 86 and 88, and a stop screw 90 held by a locking screw 92. It will be observed that the second switch assembly 72 is in orthogonal relationship to the first switch assembly 70 in that blade 80 is disposed normal to blade 56 and the path of movement of the contact 86 in moving toward and from contact 76 is at right angles to the corresponding movement of contact 62 toward and away from contact 52. The assembly 72 is sometimes referred to hereinafter as the "dynamic" switch.

Appropriate electrical leads 94 and 96 are connected to the connectors 59 and 83 respectively, and electrical leads 98 and 100 are connected to the stationary contactor screws 52 and 76. These leads extend externally of the housing, as through a connector element 102, and extend to the indicator unit through a multiconductor cable 104.

A mechanical-electrical transducer or seismic sensor 110 also is mounted on the housing 34. The sensor 110 is of appropriate design to generate an electrical signal indicative of the magnitude and frequency of the vibratory or other oscillation motion of the sensing unit 30 as measured along a predetermined axis parallel to an axis through contacts 52 and 62. Referring to FIGS. 4 and 5, the unit 110 is of a known design and comprises a casing 112 containing a fixed permanent magnet core 114 surrounded by a bobbin 116 carrying a multiturn coil 118 of an electrical conductor. The permanent magnet core 114 is fixed to the casing 112, and thus to the housing 34, while the bobbin and coil are suspended on springs 120 and 122. It will be appreciated that the acceleration and deceleration forces acting upon the bobbin and coil as the sensor 110 is oscillated along an axis parallel to the longitudinal axis of the core and coil will cause the coil to move within the constraints of the springs 120 and 122 and thus will result in relative motion between the permanent magnet and the coil to generate an electrical output signal. This signal is indicative of the vibrational energy being applied to the sensing unit 30, i.e., the amplitude and frequency of oscillational excursion. A pair of flexible electrical leads 124 extend from the coil 118 to connectors 126 on the outer end of the casing 112, and electrical leads 128 (FIG. 4) extend from those connectors through the cable 104 to a readout meter as will be referred to further below.

Referring to FIG. 7, the generator or sensor 110 may be connected to a bridge rectifier 130 for converting the periodic output signal of the generator 110 to a d.c. signal. A potentiometer 132 permits control over the gain or sensitivity of the output to a meter 134 which may be calibrated to indicate the weight of unbalance, e.g., ounces of unbalanced weight in a rotating wheel assembly 10, in accordance with the signal received. An amplifier (not shown) may be included in the circuit as necessary to obtain an adequate output signal. The potentiometer 132 is adjusted by a control knob 136 (FIG. 1) in accordance with the size, e.g., diameter, of the wheel 10 being tested.

Referring to FIG. 6, the contactors 52 and 76 are connected to the two switch terminals of a single pole double throw switch 140 which has its movable contactor connected to one side of a power source 142. The leads 94 and 100 from movable contactors 56 and 80 are connected to a common conductor 144 which is connected to the internal operating circuitry of the strobe 33, which in turn is connected to the second lead of the power source 142 through an on-off switch 146. The power applied to the switches 70 and 72 in the control circuit should be d.c. at a very low voltage, e.g., 400 microvolts. If a conventional a.c. power source is to be utilized as source 142, a transformer and a rectifier (not shown) may be included in the control circuit as necessary.

For convenience, positions about the periphery of the wheel sometimes are alluded to herein in terms of angular displacement from the top of the wheel in the direction of rotation, i.e., the angle between a vertical radius extending upward from the axis of rotation and a radius to the area being referred to as illustrated in FIG. 8.

As is known, forces generated by a rotating unbalanced wheel usually are considered as two separate force components for balancing purposes. So-called "static" unbalance refers to the net apparent unbalanced eccentric weight or the related component of force or vibration occuring in a vertical direction parallel to the plane of rotation of the wheel. Static unbalance normally is corrected by applying a weight of the requisite magnitude in an appropriate position on the periphery of the wheel rim. "Dynamic" unbalance refers to the unbalanced weight or consequent vibration as measured in a horizontal plane through the wheel axis. Dynamic unbalance is normally corrected by applying a weight of appropriate magnitude at one point on the outside rim of the wheel and a corresponding weight on the inside of the wheel at a diametrically opposite position. While both components are normally present in an unbalanced wheel, the static component usually is predominant and causes the greater undesirable vibrational results. Hence static unbalance normally is resolved and corrected prior to determining and correcting dynamic unbalance.

In operation of the aforedescribed apparatus to detect static unbalance, the sensing unit 30 is mounted on the assembly supporting a suspended wheel 10 by securing the clamp 38 to a conveniently available component of the suspension assembly, such as the lower control arm 20. The particular point of attachment depends upon the design of the wheel support assembly. However, the point of attachment should be as close to the wheel as possible both physically and mechanically to avoid distortion of the readings such as may be caused by lost motion in intervening mechanical connections between the wheel spindle and the point of attachment and by flexibility and harmonic motions of intervening components. The sensing housing 34 is oriented to be vertically disposed in a plane at right angles to the plane of rotation of the wheel 10. Thus the switch unit 70 is disposed in a vertical plane normal to the plane of rotation of the wheel. The power switch 146 is closed and selector switch 140 is set to the static position so that the switch 70 is in circuit with the strobe unit 33. Knob 136 is adjusted to set control 132 in accordance with the size of the wheel being tested.

A spinner (not shown) is then operated to rotate the wheel 10. The spinner may be of any convenient design and typically includes an electric motor driving a friction wheel which is selectively urged against the tread surface of the tire 10a for rotating the wheel in a known manner. The wheel preferably is rotated in the direction of rotation corresponding to forward movement of the vehicle. The speed of rotation of the wheel is increased slowly. Assuming that the wheel is out of balance, vibrations are imparted to the support assembly in the form of oscillating motion. The vertical component of this motion, and particularly the vertical acceleration and deceleration forces, will cause relative movement between the contact 52, which is effectively fixed to the support assembly and thus caused to move therewith, and the movable contact 62. As the member 62 moves into and out of contact with the pin 52 in timed relationship to the oscillations or vibrations imparted by the unbalanced wheel, the light 33 is actuated to instantaneously illuminate the wheel. The operator observes the apparent quasi-stationary positions of the marker 20 which results from the flashing of the light and increases the speed of the wheel slowly until a single stationary image of the marker 20 is observed. At that point, the spinner preferably is only lightly engaged or is disengaged from the wheel to avoid any incongruities that might be caused by the spinner engagement. The relative position of the stationary image of mark 20 is then noted. The reading of meter 134 also is observed as the speed of the wheel is varied, with the maximum reading being noted. Thereafter the wheel is stopped and is positioned with the marker in the position where the single image was observed. The area of apparent unbalanced weight ("heavy" area), and consequently the diametrically opposite "light" area in which weight must be added to balance the wheel, will now be in a predetermined known position. A weight or weights of a magnitude determined from the observed peak reading of meter 134 is then added at the desired position. The process may be repeated as necessary for any further adjustments until the desired balance is obtained.

The specific relative position of the heavy area, and thus of the light area, after the wheel is stopped and the marker positioned as described above, appears to be dependent upon the particular setting and adjustment of the contact elements in the sensing unit 30. In one operative embodiment, the contact screw 52 was adjusted to provide minimal clearance (0.002 inch) from the contactor 62 and the backup screw 66 was adjusted to 0.013 inch clearance, to provide only minor excursion (0.015 inch) of the contact end 62–64. With these settings the heavy area in the static balance test was at or slightly above the 270° position, and the light area, to which weight should be added to balance the wheel, was at or slightly below the 90° position when the wheel was positioned as described. In this embodiment the blade or reed 56 was ½ inch wide and 1⅝ inches long, with the holes for mounting screws 60 and for mounting the contact and weight elements 62 and 64 each three-sixteenths inch from the respective end. This blade was 0.004 inch thick and formed of 1095 spring steel stock of 48 51 Rockwell C hardness. The contact weight elements 62–64 were of brass and together weighed beween 4 and 5 grams.

For detecting and correcting dynamic unbalance, the sensory unit is attached to a frame component which responds to dynamic (horizontal) vibrations. Thus, as shown in FIG. 3, the clamp 28 is affixed to the tie rod, near the wheel, with the housing 34 oriented in a vertical plane normal to the plane of rotation of the wheel. This orients the dynamic switch 72 with the blade 80 and contactors 76 and 86 generally in a plane normal to the plane of the wheel whereby the excursion of the contact 86 as it moves toward and away from the contact 76 will be normal to the plane of the wheel. The selector switch 140 is moved to the dynamic position to place switch 72 in the control circuit to light 33. The switch 72 preferably is adjusted so that a circuit is completed through contacts 76 and 86 to actuate the light 33 under "at rest" conditions, but with minimum contact pressure between the contacts. This may be assured by appropriate adjustment of the contact screw 76. Also, after the sensor is attached to the vehicle as described, the housing 34 may be tilted downward until the light 33 is not activated, and then tilted upward to the point where the light first begins to flash continuously to insure such a contact condition.

The wheel is then rotated, as by use of a spinner, and the apparent position of the marker 20 is observed as the light 33 flashes. After a single quasi-stationary position is observed, in the manner referred to above in describing the static balance procedure, the wheel is stopped and the marker 20 is moved to the observed position. The zones of apparent dynamic unbalance will now be in known relative positions, and may be compensated by moving the static wheel weight(s) from one side of the wheel to the other and/or by adding two equal weights on opposite sides of the rim at diametrically opposite positions. With the dynamic detection switch set as described above, and with the sensor mounted on a tie rod behind the wheel spindle (relative to the direction of rotation) compensating weights should be added to the inside of the wheel at the top or 0° position and to the outside of the wheel at the bottom or 180° position. If the tie rod is in front of the spindle, the top weight should be applied to the outside of the wheel and the bottom weight to the inside of the wheel. The magnitude of weights to be added for correcting dynamic unbalance may be determined by experience and experiment or by a generator similar to unit 110 oriented parallel to switch 72.

In the instances of both static and dynamic balance, second and succeeding adjustments may be based upon observations of the position in which the newly added weight or weights are observed, under the strobe light, during such succeeding tests. With the static balance procedure referred to above, if the added weight appears stationary around the 90° position, the weight added is too light. Concomitantly, if the weight appears at the 270° position, it is too heavy. If the weight appears either in the upper or the lower quadrant, it should be shifted toward the 90° or "light weight" position. In the dynamic balance operation, if the outside weight appears near the 0° position, it is an indication that the dynamic weights are too heavy. Concomitantly, if the weight appears around the 180° position, it is an indication that the dynamic weights are too light. If the other weight appears in either the forward or the rear quadrant, it is an indication that the outer weights need to be shifted toward the 180° or light weight position, with a corresponding adjustment of the inner weight in the opposite direction.

The forces causing relative movement between the contact elements are dependent upon the amplitude and frequency of oscillatory movement of unit 30 which in turn depend upon the amount of unbalanced weight and the rate at which the unbalanced wheel is rotated. Increasing the rate of rotation of a wheel of a given unbalance thus increases the forces causing relative movement between the contact points. In operation it will be observed that higher rates of rotation normally are required to effect the necessary motion of the contacts for triggering the light circuit by wheels that have little unbalanced eccentric weight.

Various phase or positional relationships have been observed in the static test between the area of apparent unbalanced weight and the time of triggering of the light (quasi-stationary position of marker 20), with different settings of the control switch 70. By way of example, in the specific illustration given above, the wheel is illuminated when the heavy area is near the 270° position, indicating that weight should be added at the 90° position. Similarly, if the contacts 52 and 62 are set to just contact one another (light control circuit completed with essentially no spring bias by blade 56), the heavy area again appears near or just past the 270° position illustrating that weight is to be added in the 90° area. It has also been observed that with the contacts 52 and 62 adjusted to be normally closed under substantial bias force of the blade 56, the heavy area will appear near the 90° position, indicating that weight is to be added in the 270° area. Increasing the closure bias on the contacts has resulted in the pertinent areas being observed in positions shifted in a counter-rotation direction, e.g., the light area where weight should be added shifts downward toward the 180° position. Moreover, with a large gap between contacts 52 and 62, and with backup screw 66 omitted, the wheel also was observed to be illuminated with the heavy area near the 90° position and the light area near the 270° position. In the instance of each noted example, the light 33 has been observed to remain off the majority of the time, when the wheel is rotated at an adequate rate to sense the unbalance, with the light being "on ' to illuminate the wheel only periodically and at a frequency which usually is less than the rate of rotation of the wheel. However the timing of these illuminations, and thus the observed quasi-stationary position of the marker relative to the location of the heavy and light areas have been found to be reliable. The adjustments whereby the excursion of the movable contact is limited as by a stop member as illustrated, and wherein the contacts are slightly separated or contacting one another with a zero or very small biasing force are preferred.

It will be apparent to those skilled in the art that other modifications and embodiments of the specific apparatus disclosed herein may be made without departing from the spirit and scope of the invention. By way of one example, a sensing unit with a single switch assembly, such as switch 70, may be utilized to detect both static and dynamic unbalance. Such a unit would be utilized as described above for detecting static unbalance. In detecting dynamic unbalance, the sensing unit then could be attached to an appropriate frame component, as described, but with the housing oriented so that the path of movement of the movable contactor, e.g., contactor 62, is normal to the plane of the wheel. This also would orient the generator 110 to respond directly to the vibratory movement induced by dynamic unbalance. The described unit and mounting arrangement are conducive to effective use of such a simplified embodiment for detecting and measuring both conditions.

Particular construction and fabrication details of one embodiment are disclosed only by way of example, and the various components may be fabricated and assembled in other configurations.

It will be seen that improvements have been provided in apparatus for balancing rotating bodies, which meet the aforestated objects.

While a particular embodiment of this invention is shown and described herein, it will be understood, of course, that the invention is not limited thereto, since many modifications may be made by those skilled in the art, particularly in light of the teachings herein. It is contemplated, therefore, by the appended claims to cover any such modifications as fall within the true spirit and scope of this invention.

What is claimed is:

1. Apparatus for use in balancing automotive wheels comprising a sensing unit and an indicator unit, wherein said sensing unit includes a housing, a clamp device joined to said housing for detachably mounting said sensing unit on a component of an automobile adjacent a wheel being balanced, a switch mount affixed to said housing, a pair of inertia switches carried on said mount and each including a first contact member fixed relative to said mount to move with said mount and a second contact member movable toward and away from said first contact member by virtue of the inertia of said second contact member as said sensing unit is moved in accordance with vibrational movement of such component, said switches being disposed with the paths of movement of said second contact members toward and away from the respective first contact members in orthogonal relationship to one another, an electrical generator unit in said housing including a core element and a coil element with one of said elements mounted for movement relative to the other of said elements by virtue of the inertia of said movable element as said sensing unit is moved in accordance with vibrational movement of such component, said generator unit being oriented to provide such relative movement in a direction parallel to the path of movement of one of said second contact members, and said indicator unit including a strobe light having an on-off control circuit, electrical leads extending between said inertia switches and said indicating unit, a switch on said indicating unit for selectively placing either of said inertia switches in the control circuit of said strobe light, and a meter connected with said generator for providing an indication corresponding to the output of said generator.

2. An apparatus as claimed in claim 1, further comprising a bridge rectifier connected between said electrical generator unit and said meter to convert output signals of said electrical generator unit to a D.C. signal.

3. An apparatus as claimed in claim 2, further comprising a potentiometer connected between said bridge rectifier and said meter to control over the gain of the output of said meter which is calibrated to indicate the weight of unbalance in accordance with the output of said electrical generator unit.

4. An apparatus for use in balancing rotating bodies comprising:
 a support comprising a housing, said housing having a joint extending to one side thereof;
 a clamping device disposed on said joint to detachably mount said support on a component of a machine for movement of said support in accordance with vibrational movements of such component;
 an inertia switch mounted in said housing and including a first contact member constrained to move with said support and second contact member movable toward and away from said first contact member by virtue of the inertia of said first contact member as said support is moved in accordance with such vibrational movement;
 electrical leads connected to said contacts;
 generator means connected to said leads for providing an electrical signal in response to the relative position of said contacts with respect to one another, and
 said generator means mounted for relative movement in a direction parallel to the path of movement of one of said contact members.

5. An apparatus for use in balancing automotive wheels comprising:
 a sensing unit and an indicator unit, said sensing unit including a housing;
 means joined to said housing for detachably mounting said sensing unit on a component of an automobile adjacent a wheel being balanced;
 a switch mount affixed to said housing;
 a pair of inertia switches carried on said mount and each including a first contact member fixed relative to said mount to move with said mount and a second contact member movable toward and away from said first contact member by virtue of the inertia of said second contact member as said sensing unit is moved in accordance with vibrational movement of such component, said switches being disposed with the paths of movement of said second contact members toward and away from the respective first contact member in orthogonal relationship to one another;
 a seismic sensor mounted for relative movement in a direction parallel to the path of movement of one of said first and second contact members;
 said indicator unit including a strobe light having an on-off control circuit;
 electrical leads extending between said inertia switches and said indicating unit;
 means for selectively placing either of said inertia switches in the control circuit of said strobe light; and
 means connected to said seismic sensor for providing an indication corresponding to the output of said seismic sensor.

6. The apparatus of claim 5 wherein said second contact member includes an elongated flexible member having one portion fixed to said support in a distal portion extending adjacent said first contact member, and a weight member attached to a portion of said flexible member adjacent said distal portion.

* * * * *

UNITED STATES PATENT OFFICE
CERTIFICATE OF CORRECTION

Patent No. 3,906,801  Dated September 23, 1975

Inventor(s) Louis L. Butler

It is certified that error appears in the above-identified patent and that said Letters Patent are hereby corrected as shown below:

Column 5, line 38, "static" should read -- "static" --.
Column 6, line 17, "heavy" should read -- "heavy" --.
Column 6, line 18, "light" should read -- "light" --.
Column 6, line 27, "heavy" should read -- "heavy" --.
Column 6, line 28, "light" should read -- "light" --.
Column 6, line 51, "dynamic" should read -- "dynamic" --.
Column 7, line 4, "static" should read -- "static" --.
Column 7, line 37, "other" should read -- outer --.
Column 7, lines 38 and 39, "light weight" should read -- "light weight" --.
Column 7, line 60, "heavy" should read -- "heavy" --.
Column 7, line 64, "heavy" should read -- "heavy" --.
Column 8, line 1, "heavy" should read -- "heavy" --.
Column 8, line 6, "light" should read -- "light" --.
Column 8, line 10, "heavy" should read -- "heavy" --.
Column 8, line 11, "light" should read -- "light" --.
Column 8, line 15, "on" should read -- "on" --.
Column 8, line 20, "light" should read -- "light" --.

Signed and Sealed this eighth Day of June 1976

[SEAL]

Attest:

RUTH C. MASON
*Attesting Officer*

C. MARSHALL DANN
*Commissioner of Patents and Trademarks*